May 29, 1956
A. DELRUELLE
2,747,659
METHOD AND APPARATUS FOR CONCENTRATING
SCALE-FORMING PHOSPHORIC ACID
SOLUTIONS AND THE LIKE
Filed Dec. 1, 1950
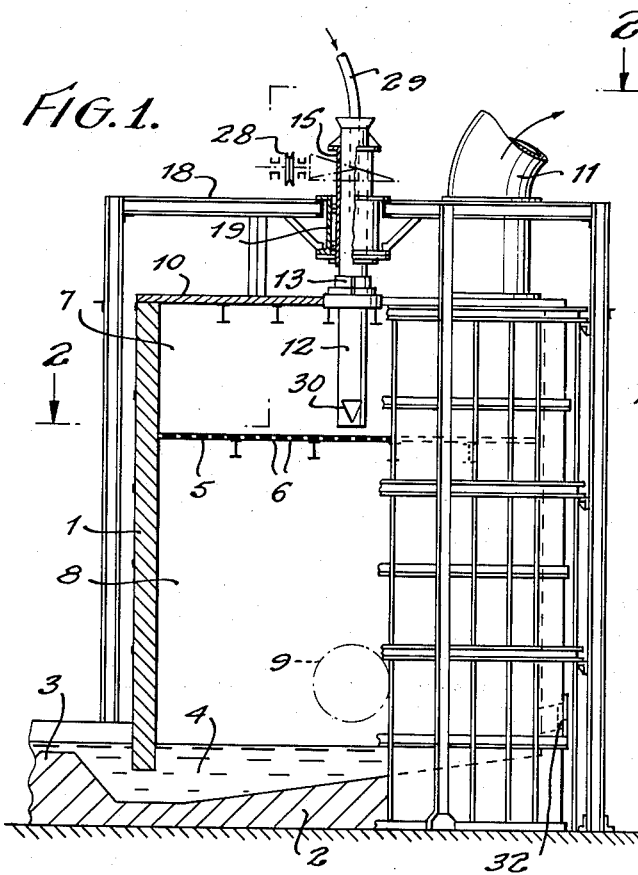
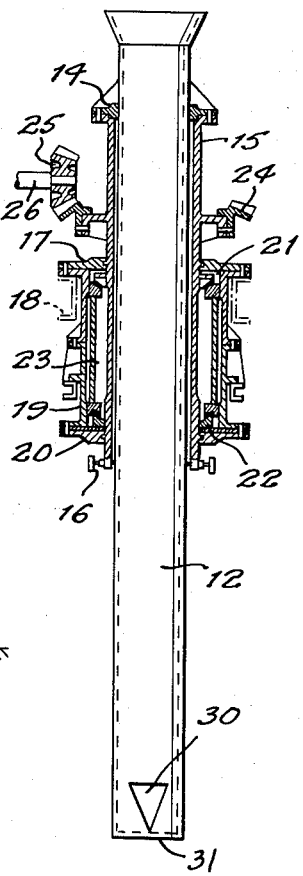
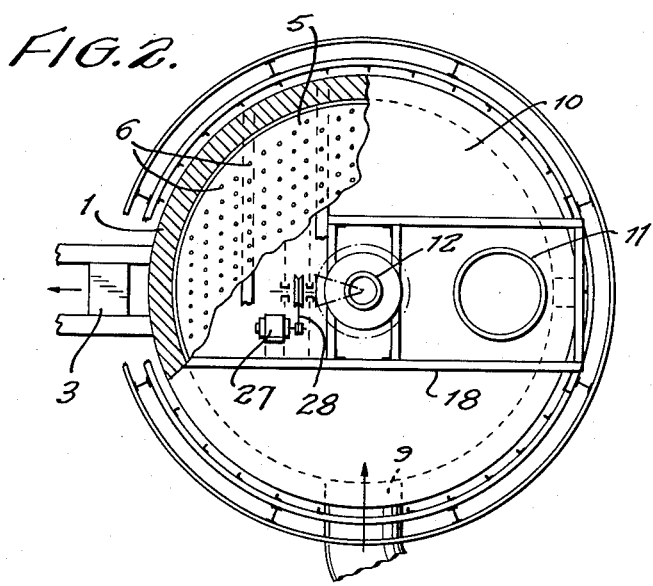
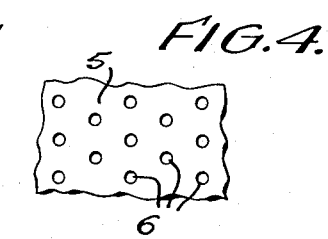
INVENTOR.
ANDRE DELRUELLE
BY Pollard and Johnston
ATTORNEYS United States Patent Office 2,747,659
Patented May 29, 1956

2,747,659
METHOD AND APPARATUS FOR CONCENTRATING SCALE-FORMING PHOSPHORIC ACID SOLUTIONS AND THE LIKE

Andre Delruelle, Trooz, Belgium, assignor, by mesne assignments, to Panmetals and Processes Inc., Panama, Panama, a corporation of Panama Application December 1, 1950, Serial No. 198,517
Claims priority, application France April 27, 1950
13 Claims. (Cl. 159—4)

The present invention relates to a method and apparatus for concentrating scale-forming phosphoric acid solutions, or other liquids containing or forming sticky or scale forming muds or crystal deposits, by action of a hot gas flow upon the liquid. The invention is particularly useful, for example, for the concentration of phosphoric acid solution separated from a slurry formed by reaction of ground phosphate rock and sulfuric acid.

The apparatus heretofore used for concentrating such phosphoric acid solutions has made use of very extensive beds which spread out the liquid to be concentrated and over which hot gases were passed to take up water vapor from the liquid. The construction and the operation of such apparatus have entailed great expense for floor space and equipment, for heating the large volumes of air or other gas employed, and for cleaning the apparatus to keep it in a serviceable condition. As the phosphoric acid solution is concentrated it tends to form crystals or muds which deposit as crusts or scales on contacting surfaces of the apparatus and soon clog or obstruct the beds and their liquid passageways.

An object of the present invention is to provide a method and apparatus for concentrating liquids of the type mentioned, which bring about an efficient heat exchange between the liquid and gases used to concentrate the liquid, and in which the tendency to become clogged by the sticky or scale forming muds or deposits formed by the phosphoric acid solution or similar liquid to be concentrated is substantially eliminated so as to avoid the difficulties encountered in the use of known apparatus. A further object of the invention is to provide such a method and apparatus whereby the gases used for contacting and concentrating a shower of the liquid are themselves scrubbed by liquid that is about to enter the shower, so that the used gases do not carry away a fog or mist of liquid.

Another object is to provide apparatus of the described character which is constructed and arranged so that those parts most likely to become clogged can be easily and quickly removed from the remainder of the apparatus to permit cleaning of such parts in an economical manner.

Another object is to provide apparatus of the described character wherein those parts requiring replacement when the operating conditions are changed, for example, when different liquids are being concentrated, can be easily and quickly removed from the remainder of the apparatus.

According to thhis invention, the above mentioned and other objects are accomplished by providing apparatus which includes a concentration chamber or tower divided into upper and lower compartments by a transverse perforated wall or screen, through which the liquid to be concentrated is showered evenly into and through the lower part or compartment of the concentration zone, and having means for introducing hot gases into the lower compartment for passage therethrough in contact with the liquid and thence upwardly through the screen, there being an outlet extending from the upper compartment for exhausting the gases and vapors that have passed upwardly through the screen and an outlet at the bottom of the lower compartment for removing the concentrated liquid collected at the bottom of the tower. A rotated liquid distributor extends vertically and removably into the upper compartment for discharging at its lower end a whirled horizontally projected jet of liquid onto the upper surface of the screen so that the latter is kept covered by a layer of the liquid, while by the force of the jet the liquid layer is continuously disturbed or churned and the liquid distributing surface is scrubbed so as to substantially eliminate clogging thereof. Further, the distributor is formed to maintain a column of liquid therein, the head of which produces a constant pressure at the discharge opening of the distributor sufficient to insure projection of the jet out to the periphery of the screen and even distribution of the liquid over the entire surface of the latter and also to cause a high rate of liquid flow through said discharge opening so that clogging of the latter and of the screen is deterred. Finally, the various conduits and openings of the apparatus embodying the invention are all formed with relatively large cross-sectional areas to decrease the tendency to be clogged or obstructed by the sticky or scale forming muds or deposits formed or contained in the liquid being concentrated.

These and other objects, features and advantages of the present invention will be manifest in the following detailed description of a preferred embodiment of the invention and in the accompanying drawing forming a part hereof, and wherein:

Fig. 1 is a side elevational view, partly broken away and in axial vertical section, of an apparatus embodying the present invention;

Fig. 2 is a top plan view of the apparatus, partly broken away and shown in a horizontal section taken along the line II—II of Fig. 1;

Fig. 3 is a vertical sectional view, on an enlarged scale, of the distributing unit of the apparatus; and Fig. 4 is a fragmentary plan view, on an enlarged scale, of an element of the apparatus.

Referring to the drawing in detail, an apparatus for concentrating liquids according to this invention is there shown to include a tower 1, preferably in the form of a massive vertical cylinder of large diameter, having a bottom 2 inclined downwardly toward one side (Fig. 1). The bottom 2, at its lowest portion, is paced downwardly from the bottom edge of the cylindrical wall of tower 1 and extends outside of the latter over a relatively narrow width (Fig. 2) to provide an outlet channel. A raised bottom portion or weir 3 is disposed in the outlet channel, outside the tower wall, and extends above the bottom edge of the latter so that the collected concentrated liquid 4 at the bottom of tower 1 normally has a level above the bottom edge of the tower wall and fills the opening formed in the latter to provide a liquid seal while permitting discharge of the collected liquid over weir 3.

A horizontal wall 5 extends transversely across tower 1 to divide the latter into an upper compartment 7 and a lower compartment 8, and is preferably formed of separable sections or sectors to facilitate the installation and removal thereof. Wall 5 receives the liquid to be concentrated and discharges such liquid downwardly into compartment 8 in a shower or rain of downspouts distributed evenly across the cross-section area of the latter, and to perform this function the distributing wall is formed with relatively large openings or perforations 6 (Fig. 4) in a staggered arrangement and occupying a small part, for example, about one-tenth, of the total area of the wall. In order to obtain the most desirable operating conditions, perforations 6 are preferably formed as circular openings approximately five centimeters in diameter and spaced from each other by approximately fourteen centimeters, while wall 5 is formed of stainless steel sheet, or any other suitable material resisting attack or corrosion by the liquid being concentrated, and is relatively thin, for example, having a thickness of a few millimeters.

A hot gas inlet 9 (Fig. 1) is formed in the side wall of tower 1 and communicates with compartment 8 of the latter to introduce hot gases to such compartment at the bottom of the latter but above the level of the collected liquid 4 for passage upwardly through the liquid shower and then through the perforated wall or screen 5. A cover 10 closes the upper end of tower 1 and an exhaust conduit 11 opens through the cover for releasing hot gases and vapors from upper compartment 7 of the tower.

The apparatus further includes a device, best seen in Fig. 3, for evenly distributing a forced jet of the liquid to be concentrated over the upper surface of perforated wall 5. This device is formed by a rotatable, vertical distributing tube 12 extending removably and axially into compartment 7 through a gas tight seal or gland 13 (Fig. 1) carried centrally by cover 10. Tube 12 is of substantial length and is open at its upper end to continuously receive a supply of the liquid to be concentrated through a pipe 29. A suitable device (not shown) of conventional construction, such as, for example a valve, is associated with the supply pipe 29 to maintain the liquid in tube 12 at a constant level near the top end thereof so that the distributing tube contains a vertical column of the liquid for maintaining a substantial and constant pressure at the bottom thereof. A discharge opening 30 is formed in the side wall of tube 12 adjacent the lower end thereof, through which the liquid passes in a radial horizontally directed jet. As the distributing tube is rotated, the radial jet of liquid is whirled and sweeps across the top surface of perforated wall 5 to keep liquid on the surface of wall 5 in a state of continual disturbance and to scrub said surface while distributing the liquid radially over the latter. In order to achieve the even distribution of the liquid on perforated wall 5, discharge opening 30 is in the form of a triangle having its apex lowermost so that the portion of the jet distributing liquid to the outer sections of wall 5 is wider than the portion of the jet covering the central sections to thereby obtain a sector-shaped pattern of contact with the perforated wall. As seen in Fig. 3, the lower edge of opening 30 is substantially in line with the top surface of the bottom closure 31 of the distributing tube so that any deposit of sticky or scale forming muds accumulating at the bottom of the tube is washed out through opening 31. This self-cleaning characteristic of the distributing device is assisted by the high rate of liquid flow through opening 31, which high rate of flow results from the substantial pressure at the bottom of the tube produced by the liquid column extending thereabove. Thus, the liquid jet emanating from distributing tube 12 as the latter rotates continuously washes across the surface of perforated wall 5 with considerable force to thereby discourage the accumulation of sticky or scale forming muds on the perforated wall and to substantially reduce clogging of perforations 6 of the latter. Since the distributing tube is rotated to distribute the liquid over the entire surface of the perforated wall or screen, opening 30 can be formed with relatively large dimensions to discourage clogging thereof, and there is no danger that the provision of the relatively large opening will cause uneven distribution of the liquid on wall or screen 5. Further, perforations 6 of the transverse wall or screen are also relatively large, although spaced substantially far apart, so that the tendency of such perforations to become clogged is less than the clogging tendency of smaller perforations.

Although the above noted features of the invention materially reduce clogging of the openings at critical points in the apparatus, thus increasing the length of the operating period before cleaning is required, it is a further object of this invention to construct mechanism for rotatably supporting tube 12 so that the latter can be easily and quickly removed for cleaning or for replacement when the operating conditions are changed, for example, when a different liquid is to be concentrated. The mechanism removably supporting the tube for rotation about a vertical axis includes a frame 18 positioned above cover 10 of the tower and supported by suitable uprights. A bearing housing carried by frame 18 includes a vertical cylinder 19, aligned axially with tower 1, and having annular sealing rings 17 and 20 at the top and bottom, respectively, thereof. A vertical sleeve 15 extends through sealing rings 17 and 20, and axially spaced anti-friction bearings 21 and 22 are mounted within the housing with their inner races secured to sleeve 15 and their outer races secured to cylinder 19 of the housing. A bracing cylinder or spacer 23 is preferably interposed between the outer races of bearings 21 and 22. As seen in Fig. 3, sleeve 15 has an inner diameter sufficient to permit tube 12 to extend loosely therein and provision is made for supporting tube 12 within the sleeve. In the preferred embodiment this support is provided by a flange 14 extending radially from tube 12, adjacent the upper end of the latter, to rest upon a suitable flange formed on the upper edge of sleeve 15, and bolts, or other suitable fastening members, are utilized for securing these flanges to each other. Angularly spaced apart, radially extending screws 16 are carried by sleeve 15 at its lower end and may be threaded inwardly to engage tube 12 and to center the latter within the supporting sleeve. Thus, tube 12 can be lifted from its supporting assembly merely by removing the fastening members holding flange 14 of the tube to sleeve 15 and by loosening centering screws 16.

Rotation of distributing tube 12 supported within sleeve 15 is effected through a bevel ring gear 24 fixed to the latter above the bearing housing and driven by a bevel gear pinion 25 mounted on a horizontal shaft 26 which is journalled in suitable bearings on frame 18. An electric motor 27 is mounted on the frame, and suitable transmission means 28, for example a pulley and belt arrangement, is provided between the motor shaft and shaft 26. Thus, the distributor tube is continuously rotated at a speed sufficient to maintain an evenly distributed layer or film of the liquid being concentrated on the upper surface of perforated wall 5.

The apparatus described above operates in the following manner. The liquid to be concentrated, such as, for example, phosphoric acid solution separated from a slurry formed by reaction of ground phosphate rock and sulfuric acid, is continuously fed by pipe 29 to distributing tube 12 so as to maintain a column of the liquid in the latter. As tube 12 is rotated, a jet of the liquid is projected from opening 30, the head of liquid in tube 12 providing sufficient pressure to project the jet from the center to the outer periphery of perforated wall 5. As noted above, the rotational speed of tube 12 and the shape of opening 30 result in the maintenance of a substantially evenly distributed film or layer of the liquid over perforated wall 5 so that there is a continuous flow of liquid through perforations 6 of the latter, this liquid layer being continually disturbed and replenished by the force of the jet. The liquid flow through perforations 6 is generally in the form of vertical downspouts of the liquid breaking into droplets at a certain distance below wall 5 to provide a shower or curtain of such droplets distributed across all of compartment 8. Hot gases, heated, for example, to a temperature of the order of five hundred degrees centigrade, are introduced to compartment 8 through inlet 9 and intimately contact the droplets of liquid to insure efficient heat transfer between the gases and the liquid being concentrated and the effective vaporization of the substance in the latter to be removed, for example water, while the concentrated liquid, for example, phosphoric acid, including any of this liquid that condenses by reflux, falls to the bottom of tower 1 to there accumulate for withdrawal over weir 3. The hot gases, humidified by the water removed from the liquid being concentrated in the form of vapor, rise through the perforated wall into upper compartment 7 and are exhausted from the latter through duct 11, these gases flowing in contact with the liquid above wall 5 and giving up entrained acid droplets to this liquid in the course of their passage to the gas outlet duct.

If desired, the concentrated liquid withdrawn over weir 3 may be recycled back through pipe 29 to distributor 12 so as to effect a more complete removal of the diluting substance. In that event, it is preferred that a quantity of fresh non-concentrated liquid, corresponding to the amount of substance removed during the original cycle, be added to the recycled concentrated liquid so that the volume of liquid being continuously processed is substantially constant. Since only about one-thirtieth of the original volume is removed by evaporation, the amount of fresh liquid to be added is relatively small and does not appreciably decrease the concentration of the processed liquid to which it is added.

In the practice of this invention the inflowing liquid to be concentrated is formed into such a well distributed layer or film on wall 5 and such an even shower of the liquid is continuously produced in compartment 8 that an extraordinarily efficient use of the heat content of the incoming gas is obtained. The heat transfer is so effective that the gas and vapors may be removed from compartment 7 at a temperature below the boiling temperature of the substance being vaporized, for example, at a temperature of about 90° C. when the gas inflow is at about 500° C. Thus the invention brings about an unusually favorable thermal balance in the concentration process.

While distributor tube 12 has been illustrated with but a single discharge opening 30, it is to be understood that several of such openings spaced around the circumference of the tube may be provided in an apparatus having a large capacity. If desired, the opening or openings 30 of the distributor tube may be inclined upwardly to give the jet emitted therefrom an upward component of motion.

Although a preferred embodiment of the invention has been illustrated and described in detail, it will be apparent that the new features of construction and operation herein disclosed may be employed in other ways without departing from the contributions of this invention or the scope of the appended claims.

What is claimed is:

1. A method of concentrating a scale-forming phosphoric acid solution or similar liquid, which comprises continuously projecting a strong jet of the liquid horizontally over a horizontally disposed foraminous distributing surface while continuously changing the course of the jet, thus spreading and maintaining a layer of the liquid over said surface and continually churning the liquid layer and scrubbing said surface by the force of the jet, continuously draining a multiplicity of streams of the liquid through said surface and showering them downwardly into a concentration zone below said surface, and passing a gaseous concentration agent in contact with the liquid shower in said zone and thence through liquid in said layer to take up vapors and concentrate the liquid.

2. A method of concentrating a scale-forming phosphoric acid solution or similar liquid, which comprises continuously projecting a strong jet of the liquid horizontally over a horizontally disposed foraminous distributing surface while continuously changing the course of the jet, thus spreading and maintaining a layer of the liquid over said surface and continually churning the liquid layer and scrubbing said surface by the force of the jet, continuously draining a multiplicity of streams of the liquid through said surface and showering them downwardly into a concentration zone below said surface, and continuously passing a hot gas in contact with the liquid shower in said zone and thence upwardly through liquid in said layer.

3. A method of concentrating a scale-forming phosphoric acid solution or similar liquid, which comprises maintaining a column of the liquid under a predetermined pressure head and continuously projecting at least one strong jet of the liquid horizontally from said column over a horizontally disposed foraminous distributing surface while continuously changing the course of the jet, thus spreading and maintaining a layer of the liquid over said surface and continually churning the liquid layer and scrubbing said surface by the force of the jet, continuously draining a multiplicity of streams of the liquid through said surface and showering them downwardly into a concentration zone below said surface, and passing a gaseous concentration agent in contact with the liquid shower in said zone and thence through liquid in said layer to take up vapors and concentrate the liquid.

4. A method of concentrating a scale-forming phosphoric acid solution or similar liquid, which comprises continuously projecting a strong jet of the liquid horizontally over a horizontally disposed foraminous distributing surface underlying the source of the jet while continuously whirling the jet horizontally, thus spreading and maintaining a layer of the liquid over said surface and continually churning the liquid layer and scrubbing said surface by the force of the jet, continuously draining a multiplicity of streams of the liquid through said surface and showering them downwardly into a concentration zone below said surface, and passing a gaseous concentration agent in contact with the liquid shower in said zone to take up vapors and concentrate the liquid.

5. An apparatus for concentrating a phosphoric acid solution or similar scale-forming liquid, comprising a massive closed tower, a horizontal perforated wall dividing said tower into upper and lower compartments, means in said upper compartment for projecting a jet of the liquid to be concentrated horizontally over said wall and for continuously changing the course of said jet so that it continuously sweeps over and maintains and churns a layer of said liquid over substantially the entire upper surface of said wall, the openings of said wall being formed to drain liquid from said surface continuously in downspouts showering into said lower compartment, a gas intake and gas offtake respectively in the lower and upper compartments for passing hot gas upwardly in contact with the showering liquid and through said wall openings to take off vapors and concentrate the liquid, and means at the bottom of said tower for collecting the concentrated liquid.

6. An apparatus for concentrating a scale-forming phosphoric acid solution or the like, comprising a massive closed tower, a horizontal perforated wall dividing said tower into upper and lower compartments, means in said upper compartment for continuously projecting a strong jet of the liquid to be concentrated horizontally over said wall and for continuously rotating said jet to sweep it horizontally over substantially the entire upper surface of said wall so that it continuously scrubs said surface and maintains a continually disturbed layer of said liquid thereon, the openings of said wall continuously delivering downspouts of liquid from said layer into said lower compartment to form a shower therein, and means for passing hot gas in contact with the liquid shower in said lower compartment and thence through said wall openings, to take off vapors and concentrate the liquid.

7. An apparatus for concentrating a scale-forming phosphoric acid solution or the like, comprising a massive closed tower, a horizontal foraminous wall dividing said tower into upper and lower compartments, a liquid distributing member rotatable about a vertical axis and disposed centrally in said upper compartment, means for continuously rotating said member, said member being formed to hold under pressure a supply of the liquid to be concentrated and having a lateral opening spaced above said wall to discharge continuously a strong jet of said liquid from said supply horizontally over said wall, the rotation of said member progressively sweeping said jet horizontally over substantially the entire upper surface of said wall to maintain and continuously churn a layer of said liquid thereon, the openings of said wall continuously draining said liquid therefrom in downspouts showering evenly into said lower compartment, and means for passing hot gas in contact with the liquid shower in said lower compartment and thence through said wall openings in contact with said liquid layer, to take off vapors and concentrate the liquid.

8. An apparatus for concentrating a scale-forming phosphoric acid solution or the like, comprising a massive closed tower, a horizontal foraminous wall dividing said tower into upper and lower compartments, a rotatable liquid distributing tube extending vertically into said upper compartment and having a lateral discharge opening at its lower end, means for continuously rotating said tube, said tube forming a receptacle for a column of the liquid to be concentrated so elongated vertically that the static pressure head of such column therein is sufficient to project a jet of said liquid horizontally through said opening substantially to the periphery of said wall, the rotation of said tube continuously sweeping said jet horizontally over and continually maintaining and churning a layer of said liquid on substantially the entire upper surface of said wall, the openings of said wall continuously draining said liquid therethrough in evenly spaced downspouts showering into said lower compartment, and means for continuously passing hot gas in contact with the liquid shower in said lower compartment and thence through said wall openings, to take off vapors and concentrate the liquid.

9. An apparatus for concentrating a scale-forming phosphoric acid solution or the like, comprising a massive closed tower, a horizontal circular foraminous wall dividing said tower into upper and lower compartments, a liquid distributing member rotatable about a vertical axis and disposed centrally in said upper compartment, means for continuously rotating said member, said member being formed to hold under pressure a supply of the liquid to be concentrated and having a triangular lateral discharge opening spaced above said wall, said opening having an apex lowermost and discharging continuously from such supply a horizontally projected jet impinging substantially evenly over a sector of the upper surface of said wall, the rotation of said member progressively sweeping said jet over substantially the entire area of said upper surface to maintain and continuously churn a layer of said liquid thereon, the openings in said wall continuously draining said liquid therefrom in downspouts showering into said lower compartment, and means for passing hot gas in contact with the liquid shower in said lower compartment and thence through said wall openings in contact with liquid in said upper compartment, to take off the vapors and concentrate the liquid.

10. In an apparatus for concentrating a scale-forming phosphoric acid solution or the like, including a massive closed tower and a substantially horizontal foraminous wall dividing said tower into upper and lower compartments: a rotatable liquid distributing tube extending vertically from above the tower into said upper compartment, means connected with a part of said tube above the tower for rotating said tube, said tube being open at its upper end to receive continuously a supply of the liquid to be concentrated, its lower end having a lateral discharge opening therein spaced above said wall but being otherwise closed, said tube forming a receptacle for a column of said liquid so elongated vertically that the static pressure head of such column therein is sufficient to project a jet of said liquid horizontally through said discharge opening substantially to the periphery of said wall, the lower edge of said opening being substantially at the lower extremity of said tube so that the force of the liquid flow to and through said opening carries out of said tube substantially all deposits present in said liquid.

11. In an apparatus for concentrating a scale-forming phosphoric acid solution of the like, including a massive closed circular tower and a substantially horizontal foraminous circular wall dividing said tower into upper and lower compartments: a rotatable liquid distributing tube extending vertically and centrally into said upper compartment, means for rotating said tube, said tube being open at its upper end to receive continuously a supply of the liquid to be concentrated, its lower end having a lateral discharge opening therein spaced above said wall but being otherwise closed, said tube forming a receptacle for a column of said liquid so elongated vertically that the static pressure head of such column therein is sufficient to project a jet of said liquid horizontally through said opening substantially to the periphery of said wall, said opening being substantially triangular and having an apex lowermost so as to project said jet substantially evenly over a sector of the upper surface of said wall.

12. An apparatus for concentrating a scale-forming phosphoric acid solution or the like, comprising a massive closed cylindrical tower, a horizontal perforated wall dividing said tower into upper and lower compartments, an elongated tube extending vertically and centrally into said upper compartment and having a lateral liquid discharge opening at its lower end above said wall, means for continuously supplying liquid to be concentrated into the upper end of said tube, said tube forming a receptacle for a column of said liquid so elongated vertically that the static pressure head of such column therein is sufficient to project a jet of said liquid horizontally through said opening substantially to the periphery of said wall, means for rotating said tube to rotate said jet horizontally and progressively over substantially the entire upper surface of said wall, so that said jet continuously maintains a layer of said liquid on and continuously scrubs said upper wall surface, the perforations of said wall continuously draining said liquid freely therethrough in a multiplicity of downspouts showering into said lower compartment, means respectively for admitting hot gas into said lower compartment and conducting gas from said upper compartment so that the hot gas passes in contact with the liquid shower and thence through said perforations in contact with liquid in said upper compartment, to take off vapors and concentrate the liquid, and means at the bottom of said tower for collecting and removing the concentrated liquid.

13. An apparatus for concentrating a scale-forming phosphoric acid solution or similar liquid, comprising a concentration tower, a horizontal liquid distributing partition dividing said tower into upper and lower compartments, means for continuously projecting a strong jet of said liquid horizontally over the upper surface of said partition, means for continuously changing the course of said jet so that the jet spreads and maintains a layer of the liquid over said surface and continually churns said liquid layer and scrubs said surface by its own force, said partition having a multiplicity of openings therein for continuously draining therethrough a multiplicity of streams of said liquid and showering them downwardly in said lower compartment, and means for passing a hot gas in contact with the liquid shower in said lower compartment and thence through said openings in contact with liquid in said layer to take off vapor and concentrate said liquid.

References Cited in the file of this patent

UNITED STATES PATENTS

| Number | Name | Date |
|---|---|---|
| 163,094 | Matthiessen | May 11, 1875 |
| 980,108 | Lillie | Dec. 27, 1910 |
| 1,271,914 | Krafft | July 9, 1918 |
| 1,733,213 | Wurster | Oct. 29, 1929 |
| 1,817,349 | Clark | Aug. 4, 1931 |
| 1,985,987 | Hall | July 29, 1932 |
| 2,043,378 | Igarashi et al. | June 9, 1936 |
| 2,384,998 | Haugh | Sept. 18, 1945 |
| 2,535,008 | Crawford | Dec. 19, 1950 |

FOREIGN PATENTS

| Number | Country | Date |
|---|---|---|
| 200,998 | Great Britain | Aug. 2, 1923 |
| 601,554 | France | Mar. 4, 1926 |
| 249,283 | Great Britain | Mar. 25, 1926 |